United States Patent
Sinnhuber

[11] Patent Number: 6,158,767
[45] Date of Patent: *Dec. 12, 2000

[54] SIDE AIRBAG ARRANGEMENT FOR A MOTOR VEHICLE

[75] Inventor: Ruprecht Sinnhuber, Gifhorn, Germany

[73] Assignee: Volkswagen AG, Wolfsburg, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/995,780

[22] Filed: Dec. 22, 1997

[30] Foreign Application Priority Data

Dec. 21, 1996 [DE] Germany .............................. 196 53 875

[51] Int. Cl.$^7$ .................................................. B60R 21/22
[52] U.S. Cl. ...................... 280/730.2; 280/735; 280/739
[58] Field of Search .............................. 280/730.2, 730.1, 280/743.1, 743.2, 729, 735, 736

[56] References Cited

U.S. PATENT DOCUMENTS

| | | | |
|---|---|---|---|
| 2,834,606 | 5/1958 | Bertrand .................................. | 280/150 |
| 3,897,961 | 8/1975 | Leising et al. ......................... | 280/150 |
| 4,966,388 | 10/1990 | Warner et al. ......................... | 280/730 |
| 5,265,903 | 11/1993 | Kuretake et al. ...................... | 280/730.2 |
| 5,458,366 | 10/1995 | Hock et al. ............................ | 280/729 |
| 5,462,308 | 10/1995 | Seki et al. .............................. | 280/749 |
| 5,556,128 | 9/1996 | Sinnhuber et al. . | |
| 5,588,672 | 12/1996 | Karlow et al. ........................ | 280/730.2 |
| 5,707,075 | 1/1998 | Kraft et al. . | |
| 5,788,270 | 8/1998 | Haland et al. ......................... | 280/729 |
| 5,865,462 | 2/1999 | Robins et al. ......................... | 280/730.2 |
| 5,899,491 | 5/1999 | Tschaeschke ......................... | 280/730.2 |

FOREIGN PATENT DOCUMENTS

| | | |
|---|---|---|
| 1381999 | 1/1975 | European Pat. Off. . |
| 0694444 | 7/1995 | European Pat. Off. . |
| 1555142 | 1/1977 | Germany . |
| 4041049 | 7/1992 | Germany . |
| 4307175 | 9/1993 | Germany . |
| 4231552 | 3/1994 | Germany . |
| 4337656 | 5/1995 | Germany . |
| 29614201 U | 11/1996 | Germany . |
| 2297950 | 2/1995 | United Kingdom . |

Primary Examiner—Paul N. Dickson
Attorney, Agent, or Firm—Baker Botts L.L.P.

[57] ABSTRACT

A side airbag arrangement for a motor vehicle has a plurality of airbag compartments mounted next to each other above a side window in a region of the roof frame and window pillar of the motor vehicle and stored there in a folded-together fashion in the deactivated state. In the activated state, the airbag compartments extend in front of the side window to provide a cover starting from that region. Each of the airbag compartments can be filled independently of the other by a control unit to achieve an improved protective effect with reduced complexity. For this purpose, each of the airbag compartments is connected by a valve to a gas duct which is mounted in the region of the roof frame and window pillar and can receive gas from two gas generators at opposite ends. The valves are controllable independently of each other.

12 Claims, 2 Drawing Sheets

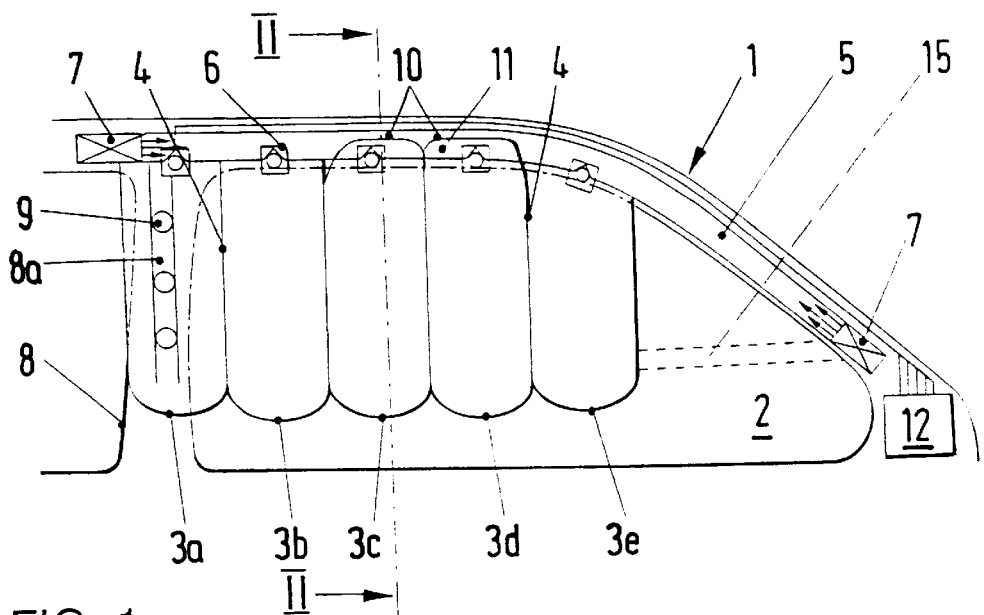
FIG. 1
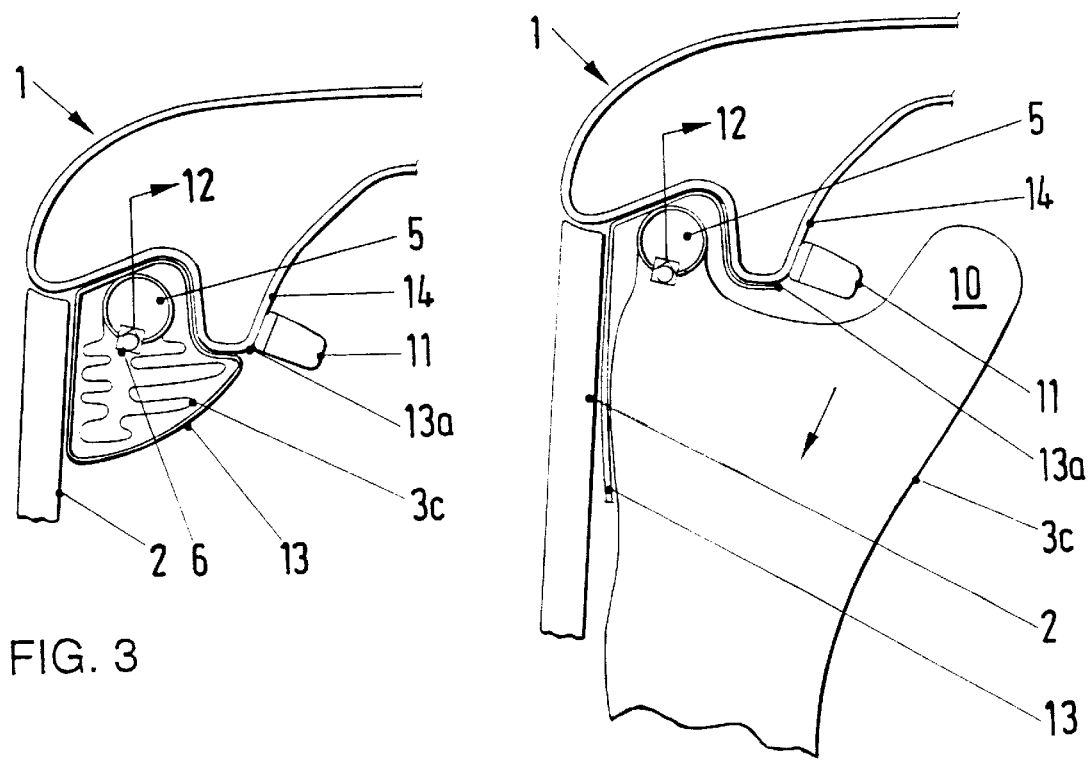
FIG. 3
FIG. 2

SIDE AIRBAG ARRANGEMENT FOR A MOTOR VEHICLE

SPECIFICATION

BACKGROUND OF THE INVENTION

This invention relates to a side airbag arrangement for motor vehicles having a plurality of airbags and, in particular, to an arrangement in which the side airbags, when activated, unfold substantially vertically downwardly.

Side airbag arrangements which are activated in the case of a collision to form a cushion between the vehicle occupant and neighboring vehicle door or side wall are known. Such airbag arrangements are usually mounted in the region of the roof frame and take up only very little space in the nonactivated state.

Side protection airbag arrangements are disclosed in U.S. Pat. No. 2,834,606 and U.S. Pat. No. 3,897,961. Pat. No. 2,834,606 describes airbags which, in the initial state, are folded together and extend above each side window in the longitudinal direction of the vehicle and, in the event of a collision, expand in the downward direction until they are in positions next to the feet of the vehicle occupant. U.S. Pat. No. 3,897,961 relates to so-called inflatable side curtains which, in the activated state, extend from a region of the roof frame downwards to below the bottom of the window of the side door. These curtains are subdivided by vertically running seams into a plurality of airbags.

German Offenlegungsschrifft No. 15 55 142 also describes an occupant side protection arrangement having a plurality of inflatable protective elements which are fastened to the upper edge of a window frame and, in the case of a collision form a lateral safety wall.

U.S. Pat. No. 4,966,388 relates to an occupant side protection arrangement having airbags which, in the state of rest, are accommodated in a vehicle door and, when activated, emerge in the upward direction from a flap which opens and are then attached to a region of the roof frame and to the vertical pillars adjacent to the window of the vehicle by touch-and-close fasteners. However, the upwardly expanding movement of the airbag below the window is disadvantageous to the extent that a the vehicle occupant often has one arm on an armrest or, especially when the side window is open, on the bottom of the window frame so that the expansion path of the airbag is not free.

In the case of those side airbag arrangements, the cushion formed by the airbags in the event of a collision assumes an undefined position and shape.

German Offenlegungsschrifft No. 43 07 175 discloses an occupant side protection airbag arrangement which is formed by interconnected airbags which, in the nonactivated state, are accommodated at least partially in a folded-together fashion in a region of the roof frame of the vehicle above a side window and, in the activated state, extend in front of the side window as a cover projecting downwardly from the region of the roof frame.

In this case, the airbags are disposed with their longitudinal axes essentially vertical, and an airbag intended to cover the window pillar is connected to the pillar by a guide in the manner of a roller guide, so that the cover formed by the airbags is fixed at one end in the horizontal direction. Each of the airbags is connected to a separate gas generator and it is possible for the activation of the gas generators to be initiated either simultaneously or else at successive times.

In the inflated state, the airbags cover the region of the side wall of the motor vehicle close to the head.

However, this arrangement is complex because the number of gas generators corresponds to the number of airbags.

If, on the other hand, the cushion is formed by a smaller number of airbags, in the extreme case only one airbag, there is the risk that the cushion will be compressed too severely when acted upon by a local impact from the occupant because the gas can be displaced into the regions not acted upon with the result that the protective effect is reduced.

Furthermore, European Patent Publication No. 0 685 366 discloses a knee cushion for knee impact protection which has a plurality of interconnected airbags arranged next to each other, each of which is connected by a one-way valve to an upstream chamber connected to a gas generator. When the gas generator is activated the chamber is filled with gas and each airbag is filled with gas from the chamber so that the gas pressure in the airbags corresponds to that in the chamber. If the gas pressure in one airbag exceeds the pressure in the chamber as a result of compression of the airbag caused by a vehicle occupant impacting it, the one-way valve closes so that the gas can no longer escape from the airbag. The arrangement of a plurality of airbags each connected to an upstream chamber in this manner provides a strengthening of the knee cushion and better knee impact protection, since smaller chambers are pressured with the gas and the gas can be displaced far less from a local area which receives an impact than with a single chamber larger airbag.

SUMMARY OF THE INVENTION

Accordingly, it is an object of the present invention to provide a side airbag arrangement for motor vehicles which overcomes disadvantages of the prior art.

Another object of the invention is to provide a side airbag arrangement for a motor vehicle in which a single side-wall airbag with a plurality of components or a plurality of airbags can be filled by a simple arrangement to achieve a better protective effect with reduced complexity.

These and other objects of the invention are attained by providing a side airbag arrangement having one or more airbags which are arranged in a region of the roof frame of a motor vehicle above a side window in a folded-together fashion in the deactivated state. In the activated state, the airbag arrangement extends downwardly from the roof region in front of the side window to provide a cover over the window. According to the invention, each airbag is connected through a valve to a gas duct which is arranged in the vicinity of the roof frame and a window pillar and, in the event of a collision is filled with gas, the airbag valves being controllable independently of one another. The invention also specifically encompasses airbag arrangements in which one or more gas pads are connected by a stretched-out cloth which, for example, extends between an A pillar and a B pillar or an A pillar and a C pillar of the vehicle and, if appropriate, is itself inflatable.

It is also advantageous for the gas duct to be supplied with gas from two gas generators operable simultaneously or at different times or else from a staged generator. This increases reliability, especially in connection with the controlled filling of individual airbags, and makes gas of adequate pressure available at each airbag immediately after gas generator activation.

This arrangement also has the advantage that only one or two gas generators are necessary for pressuring the airbags and nevertheless an optimum protective effect is achieved, and that the airbags can be inflated in the sequence appropriate for the situation, i.e. depending on the particular sitting position of the vehicle occupant in the case of a collision or else on the progression of events arising from a collision. Consequently, the airbag or airbags with which a specific part of the body of the occupant, in particular the head, will first come into contact can be inflated with priority. Thus, the entire amount of gas generated by the gas generators is available for the airbag or airbags to be filled first, which accelerates their inflation. Gas which has once been blown into an airbag can no longer escape, since the valve assigned to the airbag closes with respect to the gas duct when there is an increase in pressure in the airbag caused by the airbag being acted upon externally, and the gas remains in the airbag tinder increased pressure and, because of the limited size of the airbag, can be displaced only to a limited extent within the airbag.

The valves are controlled by an electronic control unit as a function of signals from correspondingly arranged sensors. Since such a control arrangement is readily apparent to a person skilled in the art and is not the subject of the invention, it is not discussed in any further detail.

The valves may be precontrollable one-way valves, the opening or closing of which can be prevented and, as a result, inflation of a particular airbag can be delayed.

Also of importance is the controlling of the valves as a function of the accident event. If, for example, a vehicle rollover is detected by a correspondingly designed sensor system, filling is performed in such a way that the airbags remain inflated for relatively long times and, moreover, the selectively inflated airbag chambers can contribute to energy absorption with respect to occupant impact forces. To provide predetermined filling characteristics, in the case of a preferred exemplary embodiment, flow-directing elements, for example similar to a ramp or blade, are positioned within the gas duct and can be electronically actuated with respect to their setting angle and/or through flow cross sections.

The airbags are advantageously joined together so that adjacent airbags have a shared wall, with the result that a continuous cover is provided between a vehicle occupant and the corresponding region of the side window. Consequently, a multichamber side-wall airbag is produced. At any region this airbag cover can be formed into a cushion of uniform thickness if all the airbags are filled with gas, or the cover can be arranged so that only a predetermined region, depending on the position of the vehicle occupant, is inflated into a cushion,. This cover, which is joined together in the activated state, can be arranged in a defined position in a conventional way such as disclosed in German Offenlegungsschrifft No. 43 07 175.

It is also expedient if the airbags, in the inflated state, are oriented so that their longitudinal axes are essentially vertical and, if an airbag arranged in front of the window pillar, it is connected to the pillar by a guide which operates as a roller guide. As a result, even during activation the edge of the cover is retained at the window pillar adjacent to the occupant and is secured against horizontal movement in a direction parallel to the plane of the window. Moreover, a cover having vertical alignment of the airbags is easier to implement than a cover with a different alignment of the airbags since vehicles are equipped with further safety devices (for example a safety belt) in the region of the window pillar, which would hinder in particular, airbag unfolding with any other alignment.

The side airbag system according to the invention may be constructed so that the gas duct is installed in the region of the roof frame and is accessible even in the deactivated state of the airbags. This facilitates the valve arrangement and valve actuation and increases the reliability of the overall system. The gas duct may, however, also be an airbag which extends transversely with respect to the airbags which form the cover and unfolds vertically and is inflated only by the activation of the gas generators.

The airbags may furthermore be provided with attachments for covering retaining and operating elements which protrude into the interior of the vehicle from the region of the roof frame or window pillar and in order to reduce the risk of injury.

In this case, the airbags may be of different shapes. This arrangement may also be incorporated in an independent single-chamber airbag.

In addition, protruding retaining and operating elements, such as for example handles, clothes hooks, belt-deflecting fittings or the like, may be covered by an attachment formed into the airbag for example formed in the shape of a bead. The airbag is thus increased in volume only where it is absolutely necessary in terms of safety. Thus, with this airbag arrangement very acceptable safety standards can be achieved with relatively small filling volumes.

Furthermore, even before complete filling of the airbags, the rapid formation of a first protective wall may be of advantage if, for example, the side windows were already open before the accident or the windows are broken by external damaging effects at the same time as the airbag is activated. In a preferred embodiment, the stretched-out cloth forming the protective wall is likewise designed in the manner of a narrow-walled mattress airbag and is operatively connected to the chambers of the individual airbag, or the plurality of airbags arranged next to one another, so that it forms a pulling-out aid and/or a supporting foundation for these components which are primarily designed as restraining and energy-absorption pads.

It should be emphasized that these individual variants can also be combined with one another particularly well.

BRIEF DESCRIPTION OF THE DRAWINGS

Further objects and advantages of the invention will be apparent from a reading of the following description in conjunction with the accompanying drawings, in which:

FIG. 1 is a side view illustrating a typical embodiment of an activated side airbag arrangement according to the invention in the region of the side window of a passenger vehicle;

FIG. 2 is a cross-sectional view of the side airbag arrangement, taken on the line II—II of FIG. 1 and looking in the direction of the arrows;

FIG. 3 is a view similar to FIG. 2 showing the side airbag arrangement in the deactivated state.

DESCRIPTION OF PREFERRED EMBODIMENT

Figure 4:
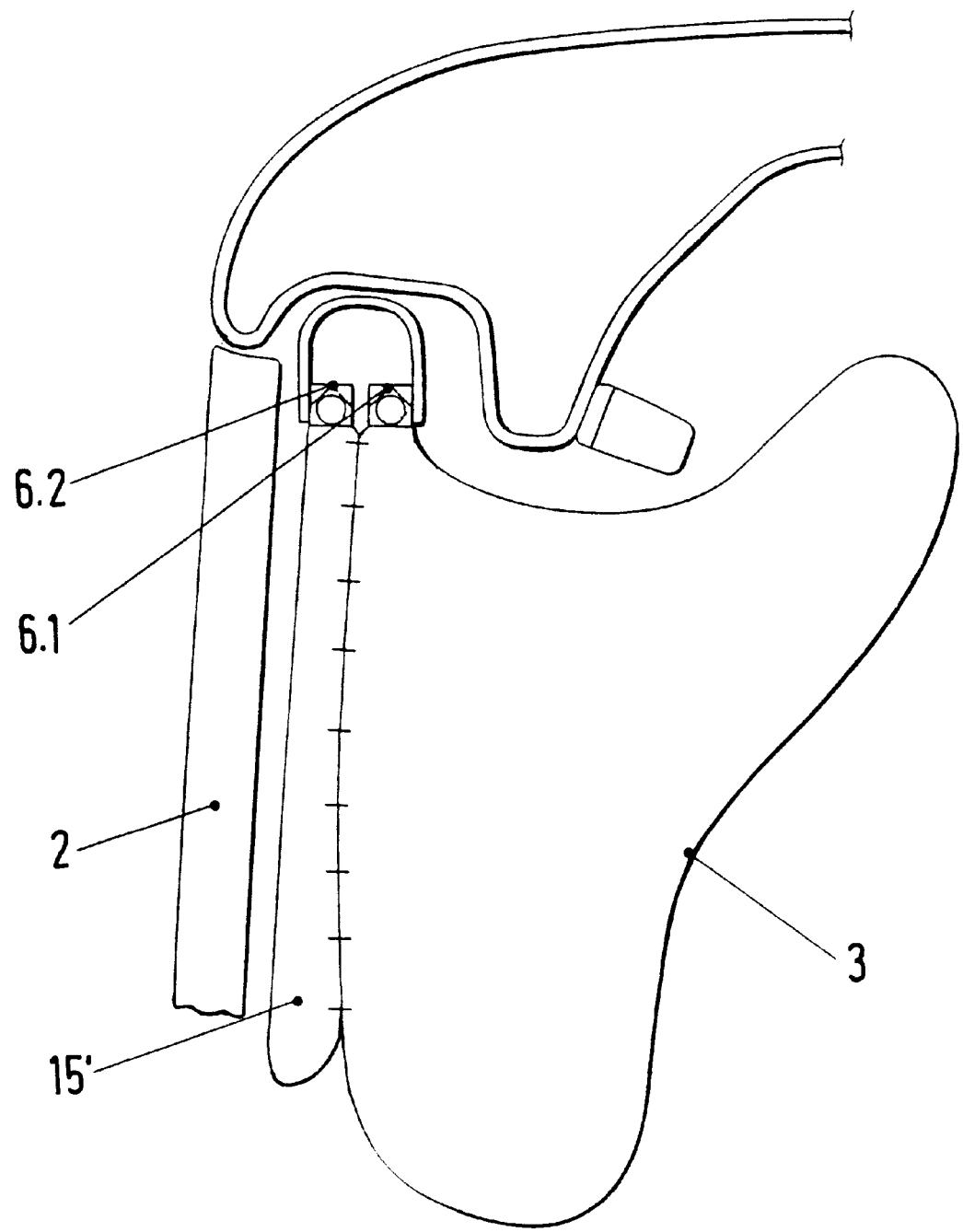
FIG. 4 is a cross-sectional view similar to FIG. 2 showing another representative embodiment having a stretched-out cloth as a pulling-out aid and/or supporting element for the airbags.

The typical embodiment of a side airbag arrangement according to the invention shown in FIG. 1 is located in a region 1 of the roof frame and window pillar of a passenger car above a side window 2. In this case the arrangement comprises five airbags 3a–3e which are arranged next to each other and are preferably joined together so that, for example, it is also possible for them to be deployed downwardly between at least two vertical pillars of the vehicle body with adjacent airbags, for example 3a and 3b or 3d and 3e, having a shared side wall 4. The airbags 3a–3e are distributed along a gas duct 5, mounted in the region 1 of the roof frame and the window pillar, and each airbag is connected to the duct by a one-way valve 6. A gas generator 7 is connected to each end of the gas duct 5. Furthermore, the airbags may also be formed with an upward extension 10, as best seen in FIG. 2, and arranged so that the extensions 10, which can also form a common chamber in the inflated state, if appropriate, cover the entire roof-frame region.

In the inflated condition illustrated in the drawings, the airbags 3a–3e are extended vertically downwardly. The airbag 3a which is inflated in the region of a window pillar 8 is guided on that pillar by rollers 9 movable in a vertical guide channel 8a, or else, for example, by cords or bands (not shown) so that it is fixed in the horizontal direction. In FIG. 1, only two of the airbags (3c and 3d) are shown with upward extensions 10 for covering a handle 11 mounted on the roof frame 1a and in FIG. 2. In one particularly advantageous embodiment of the invention, the one-way valves 6 are connected to an electronic control unit 12 by which they can be controlled independently of each other. Shown by dashed lines in FIG. 1 is a retaining band 15, which serves as a guide for the unfolding airbags along the window or side wall of the vehicle.

FIG. 3 shows the side airbag arrangement of FIG. 1 in the deactivated state. A predetermined breaking area 13a of the interior paneling 13 is provided at a bead 14 for the roof frame 1a.

The further exemplary embodiment in FIG. 4 includes a pad-like stretched-out cloth 15', which can be filled through a one-way valve 6.2 before or at the same time that the airbag 3 is filled through a one-way valve 6.1. The stretched-out cloth 15' is connected to the airbag 3 by seams (not shown) so that it pulls the airbag out even before the actual filling and continues to support it during and after its filling.

In the event of side impact, the two gas generators 7 are actuated and direct compressed gas into the gas duct 5 from both ends so that the same gas pressure is applied to each one-way valve 6. At the same time the position of the occupant in the vehicle seat is detected by corresponding sensors (not shown) and, if the occupant is sitting in a normal position, the one-way valves for the airbags 3d and 3e are opened with a delay, thereby inflating the airbags 3a–3c in an accelerated manner since the entire amount of gas pressure is initially available for them. When the gas pressure in each inflated airbag 3a–3c reaches the gas pressure in the gas duct 5, the corresponding one-way valve 6 closes, preventing the gas in that airbag from escaping, even if, for example, the head of the vehicle occupant hits the airbag. Consequently a stable protective covering is provided which is also positioned in a defined manner of the attachment of the airbag 3a to the window pillar 8 of the side-window region of the vehicle. An occupant is therefore effectively restrained and protected from injuries upon impact by specific energy absorption. If the sensors detect that occupant is out of position, other airbags, for example airbags 3c–3e, are preferentially inflated in the same manner.

Instead of the gas generators described herein, so-called staged generators can also be used, making it possible to control individual firing stages of each generator and the gas volumes contained in them by the electronic control unit 12 in a manner corresponding to the events of the collision with respect to their sequence in time and the setting of the filling characteristics.

Although the invention has been described herein with reference to specific embodiments, many modifications and variations therein will readily occur to those skilled in the art. Accordingly, all such modifications and variations are included within the intended scope of the invention.

What is claimed is:

1. A side airbag arrangement for a motor vehicle comprising:
   at least one airbag mounted in a folded-together fashion in the deactivated state in a region of a roof frame and window pillar above a side window and providing a plurality of individual chambers in an activated state in front of the side window to provide a cover starting from the roof frame and window pillar region;
   a common gas duct for supplying gas to each of the individual chambers extending adjacent to the airbag in the region of the roof frame and window pillar;
   at least one gas generator for supplying gas to the common gas duct;
   a plurality of electrically controlled valves which are controlled independently of each other, each selectively connecting an air bag chamber directly to the common gas duct; and
   an electronic control unit for independently controlling each of the plurality of valves.

2. A side airbag arrangement according to claim 1 including two gas generators for supplying gas to opposite ends of the gas duct simultaneously.

3. A side airbag arrangement according to claim 1 wherein the airbag chambers are joined together and adjacent airbag chambers have a shared wall.

4. A side airbag arrangement according to claim 3 wherein the airbag chambers extend essentially vertically in the inflated state and an airbag chamber adjacent to the window pillar is connected to the pillar by a guide.

5. A side airbag arrangement according to claim 1 wherein the valves are controllable one-way valves.

6. A side airbag arrangement according to claim 1 wherein the gas duct is mounted in fixed position in the region of the roof frame and window pillar.

7. A side airbag arrangement according to claim 1 including an upward airbag extension for covering the roof-frame region or an element in the region of the roof frame and window pillar which protrudes into the interior of the vehicle.

8. A side airbag arrangement according to claim 1 including a cloth member which is stored together with the airbag in the region of the roof frame and window pillar in the deactivated state and which can be operated to move the airbag chambers out of stored position for the purpose of activation.

9. A side airbag arrangement according to claim 8 wherein the cloth member is a bag which can be filled with gas under pressure.

10. A side airbag arrangement for a motor vehicle comprising:
    an operation element located above a side window in a region of a roof frame of a vehicle and projecting inwardly into the interior of the vehicle;
    at least one airbag mounted in a folded-together fashion in the deactivated state in a region of the roof frame and a window pillar above a side window of the vehicle and providing a plurality of individual chambers in an activated state in front of the side window to provide a cover starting from the roof frame and window pillar; and
    at least one upward airbag extension projecting upwardly upon actuation of the airbag above the top of the side window and shaped to cover the operation element to protect a vehicle passenger from impact with the operation element in the event of a collision.

11. A side airbag arrangement for a motor vehicle according to claim 10 including
    a cloth member which is stored together with the airbag in the region of the roof frame and window pillar in the deactivated state and which can be operated by gas pressure to move the airbag chambers out of position for the purpose of activation.

12. A side airbag arrangement according to claim 11 wherein the cloth member is a bag which can be filled with gas under pressure.

* * * * *